March 2, 1954 — E. PLATT — 2,670,565
TROT LINE RECEIVER AND DISPENSER
Filed Dec. 20, 1951
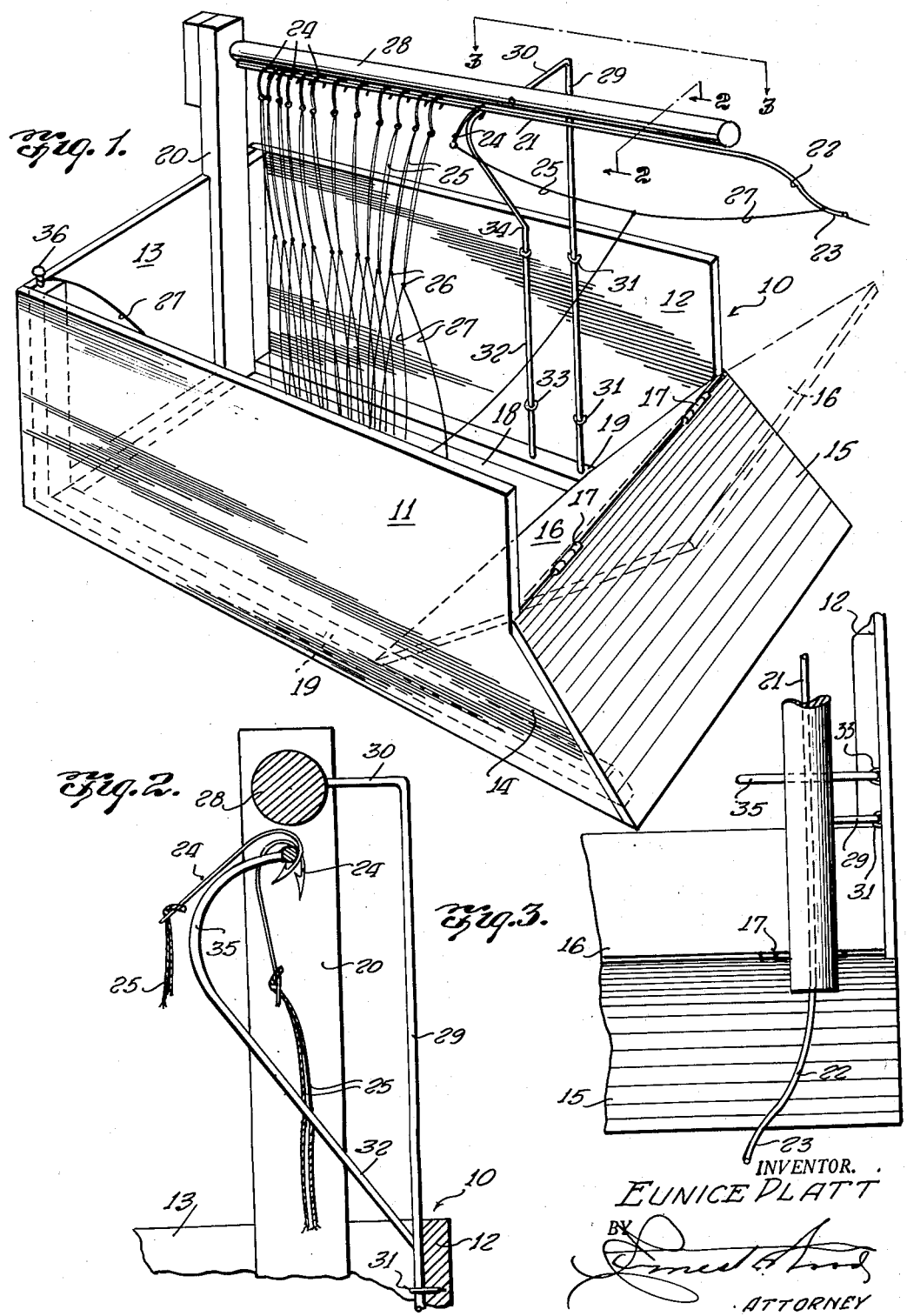
INVENTOR.
EUNICE PLATT
BY
ATTORNEY Patented Mar. 2, 1954

2,670,565

UNITED STATES PATENT OFFICE 2,670,565

TROT LINE RECEIVER AND DISPENSER

Eunice Platt, Grand Prairie, Tex.

Application December 20, 1951, Serial No. 262,507

5 Claims. (Cl. 43—57.5)

This invention relates to fishing equipment and more particularly to improvements in trot line dispensers and receivers.

The principal object of the invention is to provide a receptacle in the form of a box having an open top and end and provided with a hook supporting rod disposed above and longitudinally of the open top and on which are successively arranged the hooks of the plurality of stagings or short hook supporting lines which are connected at spaced intervals to the trot line retained in the box, the hooks being slide along and released successively and singly from the end of the supporting rod as the trot line is paid out of the box as the latter, for example, is moved away from the shore as in a boat.

Another object of the invention is to provide a trot line receiving and dispensing device in which the hooks connected to the stagings of the trot line are so supported that the foremost hook on the support is separated from the remaining hooks as the trot line is paid out of the receiver to insure spacing of the hooks in the water and to prevent the dispensing of several hooks at a time from their supporting means which would likely result in entanglement of the hooks and trot line.

Still another object of the invention is to provide a trot line receiving and dispensing device in which the rod supporting the hooks connected to the stagings of the trot line, extends beyond the open end of the box constituting the receiver and is curved in such manner that the hooks, when individually released from the end of the supporting rod will be thrust upwardly and to one side of the longitudinal axis of the box to insure clearance by the hooks of the stern of the boat in which the device is being transported.

Yet another object of the invention is to provide a trot line receiver and dispenser in which the trot line may be stored while being dried out after use and until the time when the trot line is again put into service.

With the foregoing objects in view, the invention has further reference to certain features of accomplishment which will become apparent as the description proceeds, taken in connection with the accompanying drawings wherein:

Figure 1 is a perspective view of a trot line receiver and dispenser constructed according to the present invention.

Figure 2 is a fragmentary view on a larger scale, taken on line 2—2 of Figure 1; and Figure 3 is a fragmentary view taken on line 3—3 of Figure 1.

Continuing with a more detailed description of the drawing, reference numeral 10 denotes generally a box having side walls 11 and 12 and an end wall 13. The top and the opposite end of the box 10 is open but in the said opposite end there is provided a receptacle for fishing equipment defined at its ends by projections 14 below the open end of the box, a fixed angular plate 15 and a hinged angular plate 16, the plates forming an inverted V-shaped cover for the receptacle. The plate 16, hinged at 17, lies within the box 10 and is supported in a position slightly elevated above the bottom 18 of the box by reason of the fact that it rests upon longitudinal reinforcing strips 19, forming a part of the box structure. By being so spaced from the bottom of the box, the plate 16, prevents entrapment of water within the receptacle designed in the manner set forth.

Affixed to the rear wall 13 of the box and at one side of its center is an upright 20. To the top of the upright 20 is secured one end of a rod 21. The rod 21 extends longitudinally of the box 10 and beyond the open end of the box where it is provided with a downwardly and inwardly directed bend 22 and an upwardly directed bend 23 at its free end. The purpose of these bends will be explained presently. The function of the rod 21 is to support a plurality of hooks 24 connected to the stagings 25, which are in turn connected at 26 at spaced intervals of the trot line 27 within the box 10.

To prevent the hooks 24 from being prematurely released or vertically displaced from the supporting rod 21, a restraining arm 28 is disposed slightly above the rod 21 in closely spaced parallelism therewith, having one end supported by the upright 20 and is further supported intermediate its ends by a vertical bracket 29 having a right-angular upper end 30 engaging the arm 28 and is secured in upright position to the wall 12 of the box 10 by staples 31.

The customary procedure in feeding out the trot line is to anchor one end thereof to a stationary object on the shore or in the water and to set the box 10 in the stern of a boat. As the boat moves away from the anchored end of the trot line, the latter is paid out of the box 10 by being passed over the curved end of the supporting rod 21, in the manner shown in Figure 1. As the trot line is paid out, the stagings 25 are drawn taut and the hooks 24 will move successively along the rod 21 and, in order to prevent more than one hook at a time from being released from the rod 21, a separator is provided in the form of a vertical rod 32 affixed to the box wall 12, in parallelism with the bracket 29, by means of staples 33. The rod 32 is bent inwardly at 34 to extend upwardly and is curved at 35 to extend toward the supporting rod 21, to which it is joined as by welding. Thus is provided, by virtue of the bend 35, a deflector over which each individual staging 25 is required to drag, thus raising the shank of the hook upwardly and over the deflector, after which the hook is moved to the free end of the rod 21 and is projected upwardly and laterally by the bend 23 at the end of the rod 21. The remaining hooks will be retarded in their movement by the deflector 35 until their individual stagings are brought under more or less tension in the paying out of the trot line. In this manner, entanglement of the hooks, stagings and trot line is prevented. The inner end of the trot line 27 is anchored by being secured to a pin 36 in one corner of the box 10.

When the trot line is to be returned to the box 10, the direction of the boat is reversed and each hook 24 is manually returned to the supporting rod 21, as the trot line 27 accumulates in the bottom of the box where it remains for drying until again put to use.

Manifestly, the construction as shown and described is capable of some modification and such modification as may be construed to fall within the scope and meaning of the appended claims is also considered to be within the spirit and intent of the invention.

What is claimed is:

1. In a holding and dispensing device for a trot line having spaced stagings thereon each including a fish hook, a receptacle having an open top and end, a rod supported above and longitudinally of said receptacle having a downwardly, inwardly and upwardly turned free end extending beyond the said open end of said receptacle, the hooks of said stagings being supported successively on and adapted to be slid along and released from the free end of said rod under tension imposed by the paying out of said trot line from said receptacle and a curved deflector extending laterally from said rod intermediate its ends against which said stagings are successively engaged to restrain all but the foremost of said stagings on said rod as said stagings are successively moved along said rod.

2. In a holding and dispensing device for a trot line having spaced stagings thereon each including a hook, a receptacle adapted to contain said trot line and from which said trot line is paid out, a rod supported above and extending from one end of said receptacle to a point beyond the opposite end thereof and from which the hooks of said stagings are successively suspended and adapted for longitudinal sliding movement thereon under tension imposed by the paying out of said trot line and a curved deflector in a plane perpendicular to one side of said rod and disposed in the path of said hooks for restraining all but the foremost of the group of stagings on said rod to effect successive release of said stagings from said rod.

3. In a receiver and dispenser for a trot line having spaced stagings and hooks, a box having an open top and end, means in said box for anchoring one end of a trot line, an elongated member mounted above said box in longitudinal relationship therewith and having a straight portion, and a curved portion terminating in a free end extending beyond the open end of said box, said stagings being suspended from said elongate member by the hooks on said stagings and being adapted to be moved longitudinally thereon for successive release from the free end of said member, and a curved deflector intermediate the ends of said elongate member and disposed in the path of said hooks to be engaged successively by said stagings to raise the shank of the foremost hook on said elongate member to effect successive individual release of said stagings from the free end of said member under tension imposed on said trot line during the paying out of said trot line.

4. The structure of claim 3, and means disposed above and in closely spaced parallelism with the straight portion of said elongate member to preclude upward displacement of said hooks in relation to said supporting means.

5. The structure of claim 3, in which the said elongate member free end is gradually curved inwardly, downwardly and upwardly to define a support for said trot line and to project said stagings and hooks in a lateral direction as said hooks are successively released from the free end of said elongate member.

EUNICE PLATT.

References Cited in the file of this patent

UNITED STATES PATENTS

| Number | Name | Date |
|---|---|---|
| 1,362,765 | Dice | Dec. 21, 1920 |
| 1,957,352 | Patricoski | May 1, 1934 |
| 2,100,763 | Kersenbrock | Nov. 30, 1937 |
| 2,531,643 | Pringle | Nov. 28, 1950 |
| 2,555,397 | Coward | June 5, 1951 |
| 2,599,113 | Latta et al. | June 3, 1952 |